United States Patent
Kim et al.

(10) Patent No.: US 10,865,274 B2
(45) Date of Patent: Dec. 15, 2020

(54) POLY(ALKYLENE CARBONATE) RESIN COMPOSITION, PREPARATION METHOD THEREOF, MOLDED ARTICLE FORMED THEREFROM, AND PREPARATION METHOD OF MOLDED ARTICLE USING THE SAME

(71) Applicant: LG CHEM, LTD., Seoul (KR)

(72) Inventors: Sung-Kyoung Kim, Daejeon (KR); Hyun Min Kim, Daejeon (KR); Hyun Ju Cho, Daejeon (KR); Seung Young Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 42 days.

(21) Appl. No.: 16/067,802

(22) PCT Filed: May 31, 2017

(86) PCT No.: PCT/KR2017/005697
§ 371 (c)(1),
(2) Date: Jul. 2, 2018

(87) PCT Pub. No.: WO2017/209516
PCT Pub. Date: Dec. 7, 2017

(65) Prior Publication Data
US 2019/0010282 A1 Jan. 10, 2019

(30) Foreign Application Priority Data
May 31, 2016 (KR) .................. 10-2016-0067449

(51) Int. Cl.
- C08G 64/32 (2006.01)
- C08J 3/11 (2006.01)
- C08J 5/18 (2006.01)
- C08G 64/34 (2006.01)
- C08G 64/02 (2006.01)
- C08L 69/00 (2006.01)
- C08L 77/00 (2006.01)

(52) U.S. Cl.
CPC ......... C08G 64/32 (2013.01); C08G 64/0208 (2013.01); C08G 64/34 (2013.01); C08J 3/11 (2013.01); C08J 5/18 (2013.01); C08L 69/00 (2013.01); C08L 77/00 (2013.01); *C08J 2369/00* (2013.01); *C08J 2477/00* (2013.01); *C08L 2203/16* (2013.01)

(58) Field of Classification Search
CPC ....... C08L 69/00; C08L 77/00; C09D 169/00; C09D 177/00; C09J 169/00; C09J 177/00; C08J 2369/00; C08J 2477/00; C08G 63/0208; C08G 64/34; C08G 64/0208; C06G 64/32
See application file for complete search history.

(56) References Cited

U.S. PATENT DOCUMENTS

| | | | | |
|---|---|---|---|---|
| 3,627,733 | A | * 12/1971 | Ioka | C08J 3/122 528/499 |
| 4,632,801 | A | * 12/1986 | Dowd | B29C 48/10 264/566 |
| 4,782,114 | A | 11/1988 | Perron et al. | |
| 4,883,836 | A | 11/1989 | Thill | |
| 4,940,733 | A | 7/1990 | Kuphal et al. | |
| 8,748,555 | B2 | 6/2014 | Allen | |
| 9,598,535 | B2 | 3/2017 | Hong et al. | |
| 2010/0168270 | A1 | 7/2010 | Guo et al. | |
| 2011/0309539 | A1 | 12/2011 | Steinke et al. | |
| 2012/0156410 | A1* | 6/2012 | Allen | B32B 27/36 428/35.7 |
| 2014/0135443 | A1* | 5/2014 | Aerts | C08K 5/41 524/538 |
| 2014/0370280 | A1 | 12/2014 | Jung et al. | |
| 2015/0005419 | A1 | 1/2015 | Jung et al. | |
| 2015/0094402 | A1 | 4/2015 | Hong et al. | |

FOREIGN PATENT DOCUMENTS

| | | |
|---|---|---|
| CN | 101845210 A | 9/2010 |
| CN | 101857718 A | 10/2010 |
| CN | 105176035 A | 12/2015 |
| EP | 0135848 A2 | 4/1985 |
| EP | 0 297 155 A | 1/1989 |
| EP | 2107084 B1 | 12/2010 |
| JP | 689243 B2 | 11/1994 |
| JP | 2005008673 A | 1/2005 |
| JP | 2007119609 A | 5/2007 |
| JP | 2010138326 A | 6/2010 |
| JP | 2011162684 A | 8/2011 |
| JP | 5234914 B2 | 7/2013 |
| KR | 20110127727 A | 11/2011 |
| KR | 20120048600 A | 5/2012 |
| KR | 20130118233 A | 10/2013 |
| KR | 20130124082 A | 11/2013 |
| KR | 20130124190 A | 11/2013 |
| WO | 2013013132 A1 | 1/2013 |

\* cited by examiner

OTHER PUBLICATIONS

Partial machine translation of CN 101857718 A (2019).\*

*Primary Examiner* — Kregg T Brooks
(74) *Attorney, Agent, or Firm* — Dentons US LLP

(57) ABSTRACT

Provided are a poly(alkylene carbonate) resin composition having improved mechanical properties, heat resistance, and processability, a preparation method of the poly(alkylene carbonate) resin composition, a molded article formed by using the composition, and a preparation method of the molded article, in which the poly(alkylene carbonate) resin composition includes poly(alkylene carbonate) having a weight average molecular weight of 100,000 g/mol to 500,000 g/mol and polyamide having a melting point of 180° C. to 194° C. at a weight ratio of 95:5 to 75:25.

8 Claims, No Drawings

POLY(ALKYLENE CARBONATE) RESIN COMPOSITION, PREPARATION METHOD THEREOF, MOLDED ARTICLE FORMED THEREFROM, AND PREPARATION METHOD OF MOLDED ARTICLE USING THE SAME

CROSS-REFERENCE TO RELATED APPLICATION

This application is a National Stage Application of International Application No. PCT/KR2017/005697, filed May 31, 2017, and claims the benefit of Korean Patent Application No. 10-2016-0067449, filed May 31, 2016, contents of which are incorporated herein by reference in their entirety for all purposes as if fully set forth below.

TECHNICAL FIELD

The present invention relates to a poly(alkylene carbonate) resin composition having improved mechanical properties and processibility, a preparation method of the poly(alkylene carbonate) resin composition, a molded article formed from the poly(alkylene carbonate) resin composition, and a method of preparing the molded article by using the poly(alkylene carbonate) resin composition.

BACKGROUND OF ART

After the Industrial Revolution, humans established a modern society while consuming huge amounts of fossil fuels, which, on the other hand, contributes to an increase in the concentration of carbon dioxide in the atmosphere, and this increase has been promoted by environmental destruction such as deforestation, etc. Global warming is caused by an increase of greenhouse gases such as carbon dioxide, Freon, and methane in the atmosphere, and therefore, it is very important to reduce the atmospheric concentration of carbon dioxide which significantly contributes to global warming, and various researches into emission regulations or fixation of carbon dioxide have been conducted on a global scale.

Among them, a copolymerization reaction of carbon dioxide and an epoxide has been expected to solve the global warming problem, and researches have been actively conducted in view of using carbon dioxide as a carbon source as well as in view of chemical fixation of carbon dioxide. Particularly, a poly(alkylene carbonate) resin formed by polymerization of carbon dioxide and an epoxide has recently attracted attention as a kind of biodegradable resin.

However, the poly(alkylene carbonate) resin has a low glass transition temperature (Tg) of about 38° C.~about 40° C. and is easily degraded at around 200° C. to exhibit poor heat resistance. Further, the poly(alkylene carbonate) resin is poor in mechanical properties such as tensile strength, elongation, etc., and thin film products thereof are easily broken. For this reason, use of the poly(alkylene carbonate) resin in various fields has been limited.

Therefore, in order to make up for these properties, techniques for mixing the poly(alkylene carbonate) resin with many different materials have been conducted. However, the poly(alkylene carbonate) resin has low compatibility with polyolefins such as polyethylene (PE), polypropylene (PP), etc., and therefore, there is a problem that their blending does not properly occur.

Accordingly, in order to apply the poly(alkylene carbonate) resin, which is an environmentally friendly material, to various fields, it is necessary to develop a composition capable of enhancing mechanical properties of the poly(alkylene carbonate) resin and improving compatibility and processability thereof.

DETAILED DESCRIPTION OF THE INVENTION

Technical Problem

The present invention provides a poly(alkylene carbonate) resin composition having improved mechanical properties, heat resistance, and processability, and a preparation method thereof.

Further, the present invention provides a molded article formed from the poly(alkylene carbonate) resin composition, and a preparation method thereof.

Technical Solution

The present invention provides a poly(alkylene carbonate) resin composition including poly(alkylene carbonate) having a weight average molecular weight of 100,000 g/mol to 500,000 g/mol and polyamide having a melting point of 180° C. to 194° C. at a weight ratio of 95:5 to 75:25.

Further, the present invention provides a method of preparing the poly(alkylene carbonate) resin composition, the method including the steps of: preparing poly(alkylene carbonate) having a weight average molecular weight of 100,000 g/mol to 500,000 g/mol by polymerizing monomers including alkylene oxide and carbon dioxide in the presence of a catalyst; and dry-blending the prepared poly(alkylene carbonate) with polyamide having a melting point of 180° C. to 194° C. at a weight ratio of 95:5 to 75:25, wherein the polyamide is a pellet having a diameter of 1 mm to 5 mm.

Furthermore, the present invention provides a molded article formed from the poly(alkylene carbonate) resin composition, and a method of preparing the molded article, the method including the step of molding the poly(alkylene carbonate) resin composition.

Hereinafter, a poly(alkylene carbonate) resin composition and a preparation method thereof, and a molded article formed by using the poly(alkylene carbonate) resin composition and a preparation method of the molded article according to specific embodiments of the present invention will be described in more detail.

According to one specific embodiment of the present invention, a poly(alkylene carbonate) resin composition including poly(alkylene carbonate) having a weight average molecular weight of 100,000 g/mol to 500,000 g/mol and polyamide having a melting point of 180° C. to 194° C. at a weight ratio of 95:5 to 75:25 is provided.

The present inventors recognized that, although the poly(alkylene carbonate) resin is a kind of environmentally friendly biodegradable resin prepared based on carbon dioxide rather than petroleum, and its application to various fields is possible because of its excellent transparency, elasticity, elongation, and barrier property, the poly(alkylene carbonate) resin has limitations in terms of poor heat resistance and poor mechanical properties such as tensile strength, etc. and poor compatibility with other materials, and therefore, the present inventors conducted researches to reduce the limitations.

As a result, it was confirmed by experiments that when poly(alkylene carbonate) and polyamide are blended at a weight ratio of 95:5 to 75:25, tensile strength and an initial decomposition temperature may be improved, and self-adhesive property of the poly(alkylene carbonate) may be reduced to bring an anti-blocking effect, as compared with single use of the poly(alkylene carbonate), thereby completing the present invention.

Specifically, the poly(alkylene carbonate) resin composition according to one embodiment is prepared by blending poly(alkylene carbonate) having a weight average molecular weight of 100,000 g/mol to 500,000 g/mol and polyamide having a melting point of 180° C. to 194° C. at the above-described weight ratio, leading to improvement of mechanical properties such as tensile strength, elongation, tear strength, heat resistance, etc., and an anti-blocking effect.

More specifically, referring to Examples 1 to 3 described below, when poly(alkylene carbonate) having a weight average molecular weight of 100,000 g/mol to 500,000 g/mol and polyamide having a melting point of 180° C. to 194° C. are blended at a weight ratio of 93:7 to 85:15, elongation and an initial decomposition temperature may be further improved. Further, when poly(alkylene carbonate) having a weight average molecular weight of 100,000 g/mol to 500,000 g/mol and polyamide having a melting point of 180° C. to 194° C. are blended at a weight ratio of 84:16 to 75:25, tensile strength and tear strength may be further improved.

If poly(alkylene carbonate) is blended with polyamide having a melting point outside of 180° C. to 194° C., it is difficult to improve the mechanical properties and heat resistance of the polyalkylene carbonate, and particularly, there is concern about reducing processability of the poly(alkylene carbonate) resin composition. Therefore, polyamide having a melting point of 180° C. to 194° C., 185° C. to 194° C., or 185° C. to 190° C. may be used as the polyamide. The melting point refers to a melting point as measured in accordance with ISO 3146.

Polyamide having relative viscosity of 3.5 to 5, 3.5 to 4.5, or 3.8 to 4.2 as measured according to ISO 307 and calculated by the Huggins method after dissolving polyamide in 96% (m/m) of sulfuric acid at a concentration of 1% (m/v) may be used as the polyamide. By using this polyamide, mechanical strength and heat resistance of the poly(alkylene carbonate) resin composition may be further improved.

The poly(alkylene carbonate) resin composition may include poly(alkylene carbonate) and polyamide at the above-described weight ratio, wherein the polyamide is a pellet having a diameter of 1 mm to 5 mm.

Specifically, the pellet may have a cylindrical shape. The cylindrical shape may have a diameter of 1 mm to 5 mm or 2 mm to 4 mm. Further, the cylindrical shape may have a height (thickness of the pellet) of 1 mm to 5 mm or 2 mm to 4 mm. When the polyamide pellet having the above shape and size is used, it is easy to blend the poly(alkylene carbonate) and polyamide at the above weight ratio.

Additionally, since the pellet-shaped polyamide does not require additional processing steps such as pulverization, etc., it is inexpensive and economical, as compared with polyamide in a powdery form, and since the pellet-shaped polyamide does not scatter, it is convenient to handle in the process. Further, when dry-blending of poly(alkylene carbonate) and polyamide is performed, use of the pellet form is preferred, because it is advantageous in quantitative feeding.

The polyamide may include one or more pellets selected from the group consisting of: homopolymer polyamide pellets consisting of diamines, such as nylon-6 pellets, nylon-66 pellets, nylon-11 pellets, and nylon-12 pellets, and diacids (diacid derivatives); copolymer polyamides such as nylon-6/66 pellets, nylon-6/6T pellets, nylon-6I/6T pellets, and nylon-66/6T pellets; and polyamide blends such as nylon-6I pellets.

In the poly(alkylene carbonate) resin composition of one embodiment, poly(alkylene carbonate) and polyamide may be dry-blended. The resin composition prepared by dry-blending may increase the content of polyamide, as compared with a resin composition prepared by solution-blending, and therefore, it is advantageous in terms of controlling the physical properties of poly(alkylene carbonate) resin.

More specifically, in order to prepare poly(alkylene carbonate) and polyamide by solution-blending, a solvent which is able to dissolve both of them must be selected. However, there are few organic solvents that are able to dissolve poly(alkylene carbonate) and polyamide at the same time, and the amount of polyamide that may be blended is limited due to its solubility.

In contrast, when poly(alkylene carbonate) and polyamide are dry-blended as in the poly(alkylene carbonate) resin composition of one embodiment, there is no need to consider the solubility of each component for the solvent. In particular, when a pellet having a diameter of 1 mm to 5 mm is used as the polyamide, it is possible to easily provide the mixture of poly(alkylene carbonate) and polyamide which satisfies the above-described weight ratio.

Further, when the pellet having a diameter of 1 mm to 5 mm is dry-blended with poly(alkylene carbonate), it is advantageous in that additional equipment or processes may be omitted since a molded article may be obtained by extruding the mixture into a desired shape immediately after blending them in an extruder.

However, in the case of polyamide powder having a diameter of less than the above range, it is difficult to add the polyamide powder to poly(alkylene carbonate) at the above-described weight ratio, and therefore, there is a disadvantage that mixing equipment and a mixing process are additionally required to obtain the poly(alkylene carbonate) resin composition satisfying the above-described weight ratio.

The poly(alkylene carbonate) included in the poly(alkylene carbonate) resin composition may include one or more aliphatic polycarbonates selected from the group consisting of polyethylene carbonate, polypropylene carbonate (—[O—CH$_2$CH(CH$_3$)—O—CO]$_n$—), polybutylene carbonate, polytrimethylene carbonate(—[O—CH$_2$CH$_2$CH$_2$—O—CO]$_n$—), and poly(cyclohexene carbonate), and among them, use of polyethylene carbonate is preferred in terms of resin processing.

The poly(alkylene carbonate) may have a weight average molecular weight of about 100,000 g/mol to about 500,000 g/mol, preferably, about 100,000 g/mol to about 200,000 g/mol. By using the poly(alkylene carbonate) having a weight average molecular weight within the above range, it is possible to provide a molded article having excellent mechanical properties and heat resistance and to prevent reduction of processability due to degradation of the resin during processing.

The poly(alkylene carbonate) may be prepared by reacting carbon dioxide and alkylene oxide, and a specific method of preparing the poly(alkylene carbonate) may adopt a method of preparing the poly(alkylene carbonate) resin composition described below without limitation.

According to another embodiment of the present invention, a method of preparing the poly(alkylene carbonate) resin composition is provided, the method including the steps of: preparing poly(alkylene carbonate) having a weight average molecular weight of 100,000 g/mol to 500,000 g/mol by polymerizing monomers including alkylene oxide and carbon dioxide in the presence of a catalyst; and dry-blending the prepared poly(alkylene carbonate) with polyamide having a melting point of 180° C. to 194° C. at a weight ratio of 95:5 to 75:25, wherein the polyamide is a pellet having a diameter of 1 mm to 5 mm.

In the step of preparing the poly(alkylene carbonate), the catalyst may be an organic zinc catalyst, and the organic zinc catalyst may be a zinc dicarboxylate-based catalyst. The zinc dicarboxylate may be a catalyst obtained by reacting a zinc precursor and an aliphatic dicarboxylic acid having 3 to 20 carbon atoms or an aromatic dicarboxylic acid having 8 to 40 carbon atoms.

More specifically, in the preparation of the organic zinc catalyst, the zinc precursor may be any zinc precursor which has been previously used in the preparation of the zinc dicarboxylate-based catalysts, such as zinc oxide, zinc hydroxide, zinc acetate ($Zn(O_2CCH_3)_2$), zinc nitrate ($Zn(NO_3)_2$), zinc sulfate ($ZnSO_4$), etc., without limitation.

Further, the aliphatic dicarboxylic acid or the aromatic dicarboxylic acid reacting with the zinc precursor may be any aliphatic dicarboxylic acid having 3 to 20 carbon atoms, or any aromatic dicarboxylic acid having 8 to 40 carbon atoms. More specifically, an aliphatic dicarboxylic acid selected from the group consisting of malonic acid, glutaric acid, succinic acid, and adipic acid or an aromatic dicarboxylic acid selected from the group consisting of terephthalic acid, isophthalic acid, homophthalic acid, and phenylglutaric acid may be used. However, in view of the activity of the organic zinc catalyst, use of glutaric acid as the aliphatic dicarboxylic acid is more preferred, and therefore, the zinc dicarboxylate-based organic zinc catalyst is preferably a zinc glutarate-based catalyst.

In addition, the dicarboxylic acid may be used at a molar ratio of about 1.0 to about 1.5 or about 1.1 to about 1.4 with respect to 1 mol of the zinc precursor. Accordingly, agglomeration among the catalyst particles in the preparation process of the catalyst may be more effectively suppressed while securing appropriate production of the zinc dicarboxylate-based catalyst having excellent activity, thereby preparing the catalyst having a more uniform and finer particle size and excellent activity.

The preparation of the organic zinc catalyst by reaction of the zinc precursor and dicarboxylic acid may be performed in a liquid medium, and the liquid medium may be any organic solvent which is known to uniformly dissolve or disperse the zinc precursor and/or dicarboxylic acid. Specific examples of the organic solvent may include one or more organic solvents selected from the group consisting of toluene, DMF (dimethyl formamide), ethanol, and methanol.

Further, the reaction step of the zinc precursor and the dicarboxylic acid may be performed at a temperature of about 30° C. to about 110° C. for about 5 hours to about 24 hours. The organic zinc catalyst prepared under these conditions may exhibit excellent catalytic activity together with a more uniform and finer particle size.

The above-described organic zinc catalyst may have a uniform particle shape with a finer average particle size of about 0.3 μm to about 1.0 μm, about 0.3 μm to about 0.8 μm, or about 0.5 μm to about 0.7 μm, and a particle size standard deviation of about 0.3 μm or less, about 0.05 μm to about 0.3 μm, about 0.05 μm to about 0.2 μm, or about 0.05 μm to about 0.1 μm. In particular, due to use of a dispersant during the polymerization process, the uniform and fine particle size may be maintained even during the polymerization process for preparing the poly(alkylene carbonate) resin, and as a result, a sufficient contact area with reactants such as the monomer, etc., may be maintained throughout the polymerization, and excellent catalytic activity may be expressed during the polymerization. Accordingly, the poly(alkylene carbonate) resin may be prepared in a higher yield according to an embodiment.

Meanwhile, in the method of preparing the poly(alkylene carbonate) resin according to the above-described embodiment, the organic zinc catalyst may be used in a heterogeneous catalyst form, and the polymerization step may be performed in an organic solvent by solution polymerization. Accordingly, heat of reaction may be appropriately controlled, and desired molecular weight or viscosity of the poly(alkylene carbonate) resin may be easily controlled.

In the solution polymerization, as the solvent, one or more selected from the group consisting of methylene chloride, ethylene dichloride, trichloroethane, tetrachloroethane, chloroform, acetonitrile, propionitrile, dimethylformamide, N-methyl-2-pyrrolidone, dimethyl sulfoxide, nitromethane, 1,4-dioxane, hexane, toluene, tetrahydrofuran, methyl ethyl ketone, methyl amine ketone, methyl isobutyl ketone, acetone, cyclohexanone, trichloroethylene, methyl acetate, vinyl acetate, ethyl acetate, propyl acetate, butyrolactone, caprolactone, nitropropane, benzene, styrene, xylene, and methyl propasol may be used. Among these solvents, when methylene chloride or ethylene dichloride is used as the solvent, the polymerization reaction may be more effectively performed.

The solvent may be used at a weight ratio of about 1:0.5 to about 1:100, and preferably at a weight ratio of about 1:1 to about 1:10 with respect to alkylene oxide.

Here, when the ratio is less than about 1:0.5, which is excessively small, the solvent does not appropriately function as a reaction medium such that it may be difficult to obtain the above-described advantages of the solution polymerization. Further, when the ratio is more than about 1:100, the concentration of alkylene oxide, etc. is relatively lowered such that productivity may be deteriorated, and a molecular weight of a finally formed resin may be decreased or a side reaction may be increased.

Further, the catalyst may be added at a molar ratio of about 1:50 to about 1:1000 with respect to alkylene oxide. More preferably, the catalyst may be added at a molar ratio of about 1:70 to about 1:600, or about 1:80 to about 1:300, with respect to alkylene oxide. When the molar ratio is excessively small, it is difficult to show a sufficient catalytic activity at the time of the solution polymerization. On the contrary, when the molar ratio is excessively large, an excessive amount of the catalyst is used, which is inefficient, and by-products may be generated, or back-biting of the resin may occur due to heating in the presence of the catalyst.

Meanwhile, as the alkylene oxide, one or more selected from the group consisting of: an alkylene oxide having 2 to 20 carbon atoms which are substituted or unsubstituted with a halogen, an alkyl group having 1 to 5 carbon atoms, an alkenyl group having 2 to 6 carbon atoms, or a (hetero)aryl group having 5 to 30 carbon atoms; and a cycloalkylene oxide having 3 to 20 carbon atoms which are substituted or unsubstituted with a halogen, an alkyl group having 1 to 5 carbon atoms, an alkenyl group having 2 to 6 carbon atoms, or a (hetero)aryl group having 5 to 30 carbon atoms may be used, or an alkylene oxide in which one or more —$CH_2$— are substituted with —O— may be used. The (hetero)aryl group collectively refers to both of an aryl group and a heteroaryl group.

Representative examples of the alkylene oxide may include an alkylene oxide having 2 to 20 carbon atoms which are substituted or unsubstituted with a halogen or an alkyl group having 1 to 5 carbon atoms.

More specifically, examples of the alkylene oxide may include ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxy-7-octene, epifluorohydrin, epichlorohydrin, epibromohydrin, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecene oxide, alpha-pinene oxide, 2,3-epoxy norbornene, limonene oxide, dieldrin, 2,3-epoxypropylbenzene, styrene oxide, phenylpropylene oxide, stilbene oxide, chlorostilbene oxide, dichlorostilbene oxide, 1,2-epoxy-3-phenoxypropane, benzyloxymethyl oxirane, glycidyl-methylphenyl ether, chlorophenyl-2,3-epoxypropyl ether, epoxypropyl methoxyphenyl ether, biphenyl glycidyl ether, glycidyl naphthyl ether, etc. Most representatively, the alkylene oxide may be ethylene oxide.

Meanwhile, the above-described solution polymerization may be performed at about 50° C. to about 100° C. and about 15 bar to about 50 bar for about 1 hour to about 60 hours. Further, it is more preferable to perform the solution polymerization at about 70° C. to about 90° C. and about 20 bar to about 40 bar for about 3 hours to about 40 hours.

Since other polymerization processes and conditions except for the above description may follow general polymerization conditions for preparing the poly(alkylene carbonate) resin, additional descriptions thereof will be omitted.

Next, the method of preparing the poly(alkylene carbonate) resin composition of one embodiment includes the step of dry-blending the poly(alkylene carbonate) prepared according to the step of preparing the poly(alkylene carbonate) and polyamide at a weight ratio of 95:5 to 75:25.

As described above, although the poly(alkylene carbonate) resin is a kind of environmentally friendly biodegradable resin prepared based on carbon dioxide rather than petroleum, and its application to various fields is possible because of its excellent transparency, elasticity, and barrier property, the poly(alkylene carbonate) resin has limitations in terms of poor mechanical properties and poor compatibility with other materials. In contrast, as in the method of preparing the poly(alkylene carbonate) resin composition of one embodiment, when the poly(alkylene carbonate) having a weight average molecular weight of 100,000 g/mol to 500,000 g/mol and the polyamide having a melting point of 180° C. to 194° C. are dry-blended at a weight ratio of 95:5 to 75:25, it is possible to prepare the poly(alkylene carbonate) resin composition having improved tensile strength and initial decomposition temperature and an anti-blocking effect by reducing its self-adhesive property.

Specific descriptions of the poly(alkylene carbonate) and polyamide are the same as in the above description of the poly(alkylene carbonate) resin composition of one embodiment.

Meanwhile, since dry blending may increase a mixing content of the polyamide, as compared with solution blending, the poly(alkylene carbonate) resin composition having much better mechanical properties may be prepared.

The dry-blending step may be performed according to a common dry-blending method, conditions, etc. Preferably, after blending the pellets at an appropriate composition at room temperature, the poly(alkylene carbonate) resin composition that is compatibilized with the polyamide may be prepared through an extruder such as a T-die.

Meanwhile, according to still another embodiment, a molded article formed from the poly(alkylene carbonate) resin composition of one embodiment and a method of preparing the molded article including the step of molding the poly(alkylene carbonate) resin composition are provided.

The molding step may include the step of molding the composition into a film by extrusion.

As such, the molded article prepared by molding the poly(alkylene carbonate) resin composition including the poly(alkylene carbonate) and polyamide at a weight ratio of 95:5 to 75:25 may have improved mechanical properties such as tensile strength, improved heat resistance such as initial decomposition temperature, etc., and improved processability, and may have an anti-blocking effect by reducing self-adhesive property.

Since other processes and conditions for molding and extruding the resin composition except for the above description may follow general processes and conditions for molding resin compositions, additional descriptions thereof will be omitted.

Advantageous Effects

According to the present invention, a poly(alkylene carbonate) resin composition having improved mechanical properties, heat resistance, and processability may be prepared by blending a poly(alkylene carbonate) having a particular molecular weight and a polyamide having a particular melting point at a weight ratio of 95:5 to 75:25.

DETAILED DESCRIPTION OF THE EMBODIMENTS

Hereinafter, the present invention will be described in more detail with reference to the following examples. However, these examples are for illustrative purposes only, and the scope of the present invention is not intended to be limited by these examples.

Example 1

(1) Preparation of Polyethylene Carbonate

In a glove box, a catalyst and methylene chloride (MC) were added to a high-pressure reactor, and ethylene oxide (EO) was added thereto. Subsequently, carbon dioxide ($CO_2$) was injected into the reactor, and polymerization was allowed at 70° C. for 3 hours. After the reaction was completed, unreacted carbon dioxide and ethylene oxide were removed together with methylene chloride which is a solvent.

The polyethylene carbonate thus prepared had a weight average molecular weight of 140,000 g/mol, and was prepared in pellets (diameter: 3 mm, thickness: 3 mm) through an extruder.

(2) Preparation of Polyethylene Carbonate Resin Composition

95% by weight of the polyethylene carbonate resin prepared in (1) and 5% by weight of pellets (diameter: 2 mm to 2.5 mm, thickness: 2 mm to 2.5 mm, melting point as measured according to ISO 3146: 189° C., nylon 6/66 copolymer, relative viscosity as measured by ISO 307 and calculated by the Huggins method after dissolving polyamide in 96% (m/m) of sulfuric acid at a concentration of 1% (m/v): 3.89 to 4.17) which is a polyamide supplied by BASF under the trade name of Ultramid C40L were uniformly dry-blended by shaking. This mixture was dried in a vacuum oven at 40° C. for 12 hours, and then compounded pellets (diameter: 3 mm, thickness: 3 mm) and a film (width: 100 mm, length: 5000 mm, thickness: 0.025 mm) were prepared by using a twin screw extruder.

Example 2

A polyethylene carbonate resin composition was prepared in the same manner as in Example 1, except that the content of polyamide was changed to 10% by weight, and pellets and a film were prepared by using the polyethylene carbonate resin composition.

Example 3

A polyethylene carbonate resin composition was prepared in the same manner as in Example 1, except that the content of polyamide was changed to 20% by weight, and pellets and a film were prepared by using the polyethylene carbonate resin composition.

Comparative Example 1

A polyethylene carbonate resin composition was prepared in the same manner as in Example 1, except that no polyamide was used, and pellets and a film were prepared by using the polyethylene carbonate resin composition.

Comparative Example 2

A polyethylene carbonate resin composition was prepared in the same manner as in Example 1, except that the content of polyamide was changed to 3% by weight, and pellets and a film were prepared by using the polyethylene carbonate resin composition.

Comparative Example 3

A polyethylene carbonate resin composition was prepared in the same manner as in Example 1, except that polyethylene carbonate having a weight average molecular weight of 80,000 g/mol was used, and pellets and a film were prepared by using the polyethylene carbonate resin composition.

Comparative Example 4

A polyethylene carbonate resin composition was prepared in the same manner as in Example 1, except that the polyamide pellets used in Example 1 were pulverized and used in a powdery form having a diameter of about 40 μm, and pellets and a film were prepared by using the polyethylene carbonate resin composition.

Comparative Example 5

A polyethylene carbonate resin composition was prepared in the same manner as in Example 1, except that pellets (diameter: 2 mm to 2.5 mm, thickness: 2 mm to 2.5 mm, melting point as measured according to ISO 3146: 195° C. to 197° C., nylon 6/66 copolymer, relative viscosity as measured by ISO 307 and calculated by the Huggins method after dissolving polyamide in 96% (m/m) of sulfuric acid at a concentration of 1% (m/v): 3.19 to 3.41) which is a polyamide supplied by BASF under the trade name of Ultramid C33 was used, and pellets and a film were prepared by using the polyethylene carbonate resin composition.

Experimental Example

Physical properties of the poly(alkylene carbonate) resin compositions prepared in Examples 1 to 3 and Comparative Examples 1 to 5 were measured by the following methods, and results are shown in Table 1.

(1) Tensile strength: Dumbbell-shaped samples were prepared in accordance with ASTM D638, and then tensile strength (TS max, kgf/cm$^2$) was measured at a speed of 50 mm/min by using a UTM (Universal Testing Machine, Instron). The same test was repeated five times, and mean values thereof are shown in Table 1.

(2) Elongation: Samples were prepared as in the test of tensile strength, and then elongation (%) was measured under the conditions of measuring the tensile strength by using the UTM, when the sample was stretched until the sample was broken. The same test was repeated five times, and mean values thereof are shown in Table 1.

(3) Tear strength: Samples were prepared in accordance with ASTM D 1004, and then tear strength was measured. The same test was repeated five times, and mean values thereof are shown in Table 1.

(4) Initial decomposition temperature: 10 mg of the sample was taken, and a decomposition temperature was measured by using a thermogravimetric analyzer (Mettler Toledo) while raising the temperature to 600° C. at a rate of 10° C./min.

TABLE 1

| Unit | Tensile strength kgf/cm$^2$ | Elongation % | Tear strength kg/cm | Initial decomposition temperature ° C. |
|---|---|---|---|---|
| Example 1 | 211 | 537 | 50 | 253 |
| Example 2 | 333 | 720 | 48 | 263 |
| Example 3 | 420 | 404 | 71 | 260 |
| Comparative Example 1 | 142 | 423 | 43 | 226 |
| Comparative Example 2 | 182 | 457 | 45 | 248 |
| Comparative Example 3 | 196 | 483 | 43 | 251 |
| Comparative Example 4 | Difficult feeding of predetermined amount into extruder | | | |
| Comparative Example 5 | Difficult film molding | | | |

Referring to Example 1 and Comparative Examples 1 and 2, it was confirmed that the poly(alkylene carbonate) resin composition of Example 1 showed excellent mechanical properties such as tensile strength, elongation, tear strength, etc., and an increased initial decomposition temperature, as compared with those of Comparative Examples 1 and 2 including no polyamide or a small amount of polyamide.

Referring to Example 1 and Comparative Example 3, it was confirmed that the poly(alkylene carbonate) resin composition of Comparative Example 3 using poly(alkylene carbonate) having a weight average molecular weight of less than 100,000 g/mol showed reduced mechanical properties and a low initial decomposition temperature, even though a particular amount of polyamide having a particular shape and size according to the present invention was added, as compared to the poly(alkylene carbonate) resin composition of Example 1 to which the same amount of polyamide was added.

Referring to Example 1 and Comparative Example 4, the same polyamide as used in Example 1 was used in Comparative Example 4, but the polyamide was a powder having a diameter of 40 µm. Although the same polyamide as used in Example 1 was used in Comparative Example 4, the polyamide was not well blended with the poly(alkylene carbonate), and it was impossible to add 5% by weight of polyamide to 95% by weight of poly(alkylene carbonate). As a result, it was confirmed that only when the diameter of the polyamide is controlled to 1 mm to 5 mm could the poly(alkylene carbonate) and the polyamide be blended at the ratio at which excellent mechanical properties and high initial decomposition temperature may be achieved.

Referring to Example 1 and Comparative Example 5, since polyamide having a melting point of higher than 194° C. was used in Comparative Example 5, it was impossible to extrusion-mold the composition in a film shape, unlike Example 1. As a result, it was confirmed that only when the melting point of the polyamide is controlled to 180° C. to 194° C. is it possible to provide a poly(alkylene carbonate) resin composition showing excellent moldability.

Meanwhile, referring to Examples 1 to 3, it was confirmed that tensile strength was improved with increasing content of the polyamide. Further, when the content of the polyamide was 7% by weight to 15% by weight (Example 2), much better elongation and initial decomposition temperature were achieved, and when the content of the polyamide was 16% by weight to 25% by weight (Example 3), much better tensile strength and tear strength were achieved.

The invention claimed is:

1. A poly(alkylene carbonate) resin composition comprising a poly(alkylene carbonate) having a weight average molecular weight of 100,000 g/mol to 500,000 g/mol and a polyamide having a melting point of 180° C. to 194° C. at a weight ratio of 95:5 to 75:25,
   wherein the poly(alkylene carbonate) is polyethylene carbonate, and
   wherein the polyamide has relative viscosity of 3.5 to 5 as measured according to ISO 307 and calculated by the Huggins method after dissolving polyamide in 96% (m/m) of sulfuric acid at a concentration of 1% (m/v).

2. The poly(alkylene carbonate) resin composition of claim 1, wherein the polyamide is in a pellet form having a diameter of 1 mm to 5 mm, and is blended with the poly(alkylene carbonate).

3. The poly(alkylene carbonate) resin composition of claim 1, wherein the polyamide includes one or more pellets selected from the group consisting of nylon-6 pellets, nylon-66 pellets, nylon-11 pellets, nylon-12 pellets, nylon-6/66 pellets, nylon-6/6T pellets, nylon-6I/6 T pellets, nylon-66/6T pellets, and nylon-6I pellets.

4. The poly(alkylene carbonate) resin composition of claim 1, wherein the poly(alkylene carbonate) and the polyamide are dry-blended.

5. A method of preparing a poly(alkylene carbonate) resin composition, the method comprising the steps of:
   preparing a poly(alkylene carbonate) having a weight average molecular weight of 100,000 g/mol to 500,000 g/mol by polymerizing monomers including an alkylene oxide and carbon dioxide in the presence of a catalyst; and
   dry-blending the prepared poly(alkylene carbonate) with a polyamide having a melting point of 180° C. to 194° C. at a weight ratio of 95:5 to 75:25, wherein the polyamide is a pellet having a diameter of 1 mm to 5 mm,
   wherein the poly(alkylene carbonate) is polyethylene carbonate, and
   wherein the polyamide has relative viscosity of 3.5 to 5 as measured according to ISO 307 and calculated by the Huggins method after dissolving polyamide in 96% (m/m) of sulfuric acid at a concentration of 1% (m/v).

6. A molded article which is molded from the composition of claim 1.

7. A method of preparing a molded article, the method comprising the step of molding the composition of claim 1.

8. The method of claim 7, wherein the molding step includes the step of molding the composition into a film by extrusion.

* * * * *